(12) United States Patent
Low et al.

(10) Patent No.: US 10,013,549 B2
(45) Date of Patent: *Jul. 3, 2018

(54) OCR-BASED SINGLE SIGN-ON

(71) Applicant: International Business Machines Corporation, Armonk, NY (US)

(72) Inventors: Chee Meng Low, Singapore (SG); Nandagopal Seshagiri, Berkeley, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/331,386

(22) Filed: Oct. 21, 2016

(65) Prior Publication Data

US 2017/0039362 A1 Feb. 9, 2017

Related U.S. Application Data

(63) Continuation of application No. 13/851,047, filed on Mar. 26, 2013, now Pat. No. 9,495,534.

(51) Int. Cl.
*G06F 21/41* (2013.01)
*G06F 3/01* (2006.01)
(Continued)

(52) U.S. Cl.
CPC .............. *G06F 21/41* (2013.01); *G06F 3/01* (2013.01); *G06F 3/048* (2013.01);
(Continued)

(58) Field of Classification Search
CPC .......... G06F 3/01; G06F 3/048; G06F 21/305; G06F 11/00; G06F 21/41; G06F 21/45; G06F 2221/031

See application file for complete search history.

(56) References Cited

U.S. PATENT DOCUMENTS

| 5,511,185 A | 4/1996 | Weinbaum et al. |
| 8,185,938 B2 | 5/2012 | Benantar |

(Continued)

FOREIGN PATENT DOCUMENTS

| WO | 1999032987 | 7/1999 |
| WO | 2008024454 | 2/2008 |

OTHER PUBLICATIONS

David J. Kasik et al., Toward automatic generation of novice user test scripts, Proceedings of the SIGCHI Conference on Human Factors in Computing Systems, pp. 244-251 (ACM 1996).*

(Continued)

*Primary Examiner* — Theodore C Parsons
(74) *Attorney, Agent, or Firm* — James L. Baudino

(57) ABSTRACT

A method and technique for OCR-based single sign-on in a computing environment includes automatically causing a display of a dialog screen of an application in response to launching a login interface of the application. An image of the dialog screen is automatically captured, and version information about the application is derived from the image of the dialog screen. An image of the login interface is automatically captured, and the launched login interface is automatically verified as corresponding to a version of the application based on the version information derived from the image of the dialog screen.

20 Claims, 6 Drawing Sheets

(51) Int. Cl.

| | | |
|---|---|---|
| *G06F 21/45* | (2013.01) | |
| *G06F 21/30* | (2013.01) | |
| *G06F 3/048* | (2013.01) | |
| *G06F 11/00* | (2006.01) | |
| *G06F 3/0489* | (2013.01) | |
| *G06K 9/18* | (2006.01) | |
| *G06T 7/00* | (2017.01) | |
| *H04L 29/06* | (2006.01) | |
| *G06T 7/73* | (2017.01) | |

(52) U.S. Cl.
CPC .......... *G06F 3/04892* (2013.01); *G06F 11/00* (2013.01); *G06F 21/305* (2013.01); *G06F 21/45* (2013.01); *G06K 9/18* (2013.01); *G06T 7/0002* (2013.01); *G06T 7/73* (2017.01); *H04L 63/0815* (2013.01); *G06F 2221/031* (2013.01)

(56) References Cited

U.S. PATENT DOCUMENTS

| | | |
|---|---|---|
| 9,154,611 B1 | 10/2015 | Jackson et al. |
| 2005/0278728 A1 | 12/2005 | Klementiev |
| 2008/0301816 A1 | 12/2008 | Ting et al. |
| 2010/0027896 A1 | 2/2010 | Geva et al. |
| 2012/0253745 A1 | 10/2012 | Dhanapal et al. |
| 2013/0019170 A1 | 1/2013 | Mounty et al. |
| 2013/0159784 A1 | 6/2013 | Rossi |
| 2013/0159890 A1 | 6/2013 | Rossi |
| 2013/0326466 A1 | 12/2013 | Rachelson et al. |
| 2014/0118239 A1 | 5/2014 | Phillips |
| 2015/0089620 A1 | 3/2015 | Manza et al. |

OTHER PUBLICATIONS

Oracle; Enterprise Single Sign-On Manager; Template Configuration and Diagnostics for Windows Applications; Release 11.1.2; Aug. 2012.

Micro Focus IP Development Limited; Inserting OCR Verification Functions; Silk Performer 9.5; (http://documentation.microfocus.com/help/index.jsp?topic=%2Fcom.microfocus.silkperformer.doc%2FSILKPERF-0155CA04-Insertingocrverificationfunctions-TSK.html); released May 12, 2012.

Microsoft; Windows Dev Center—Desktop; SendInput function (Windows); (http://msdn.microsoft.com/en-us/library/windows/desktop/ms646310%28v=vs.85%29.aspx); 2009.

IBM; Enhanced avoidance of Key-stroke logging spyware; IP.com No. IPCOM000145216D; Jan. 10, 2007.

Borjesson, E. et al.; Automated System Testing Using Visual GUI Testing Tools: A comparative Study in Industry; 2012 IEEE Fifth International Conference on Software Testing, Verification and Validation (ICST); pp. 350-359; Apr. 2012.

Givens, P. et al.; Exploring the internal state of user interfaces by combining computer vision techniques with grammatical inference; 2013 35th International Conference on Software Engineering (ICSE); pp. 1165-1168; May 2013.

Yeh, Tom, et al.; Sikuli: Using GUI Screenshots for Search and Automation; Proceedings of the 22nd annual ACM symposium on User interface software and technology (UIST '09); pp. 183-192; 2009.

\* cited by examiner

OCR-BASED SINGLE SIGN-ON

BACKGROUND

Single sign-on (SSO) software is generally used to assist a user to login or sign-on to multiple applications and/or systems using a single credential(s) (e.g., username and/or password). For example, a user may use SSO software to login or sign-on one time and gain access to multiple applications/systems without being prompted to login again at each distinct system/application. SSO software generally relies on a number of different techniques for auto-filling username and passwords (other authentication credentials) into input fields of applications. For example, one approach is to hook into the application user interface (UI) to be able to intercept and inject UI messages from/to various UI controls on the application screens. Another technique is to use "send keys" to send keystrokes to the system/application UI or window to move a cursor to different input fields as well as to inject the sign-on credential(s).

BRIEF SUMMARY

According to one aspect of the present disclosure a method and technique for OCR-based single sign-on in a computing environment is disclosed. The method includes automatically causing a display of a dialog screen of an application in response to launching a login interface of the application. An image of the dialog screen is automatically captured, and version information about the application is derived from the image of the dialog screen. An image of the login interface is automatically captured, and the launched login interface is automatically verified as corresponding to a version of the application based on the version information derived from the image of the dialog screen.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
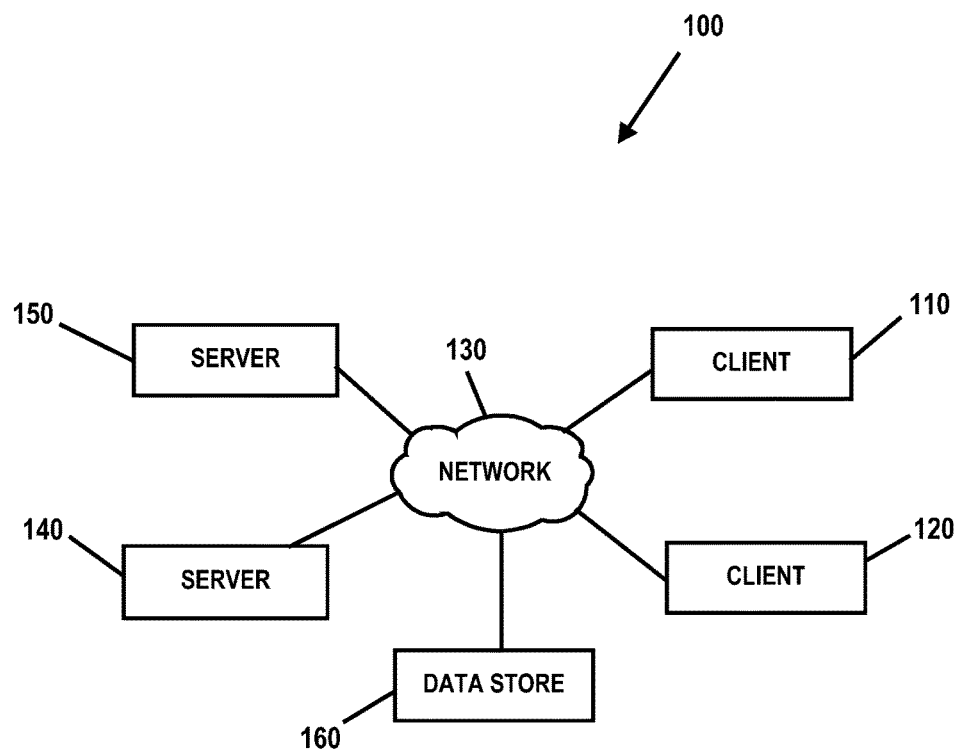
FIG. 1 is an embodiment of a network of data processing systems in which the illustrative embodiments of the present disclosure may be implemented.

Embodiments of the present disclosure provide a method, system and computer program product for OCR-based single sign-on in a computing environment. For example, in some embodiments, the method and technique includes: responsive to launching of an application login interface, capturing an image of the login interface; determining a location of a cursor on the login interface from the image; determining whether the location of the cursor corresponds to a credential input field of the login interface; and responsive to determining that the location of the cursor corresponds to the credential input field of the login interface, automatically sending a keystroke to the login interface to insert at least one character to the login interface. Thus, embodiments of the present disclosure enable a single sign-on (SSO) procedure to be carried out using image/screenshot analysis to monitor and verify various steps of the SSO procedure, thereby providing feedback to the SSO agent performing the SSO procedure. Embodiments of the present disclosure utilize one or more screenshots/image captures of an application login interface/window and image analysis of the captured screenshots/images to monitor positional information, character insertion information, and/or other features associated with verifying proper SSO operations performed by the SSO agent.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
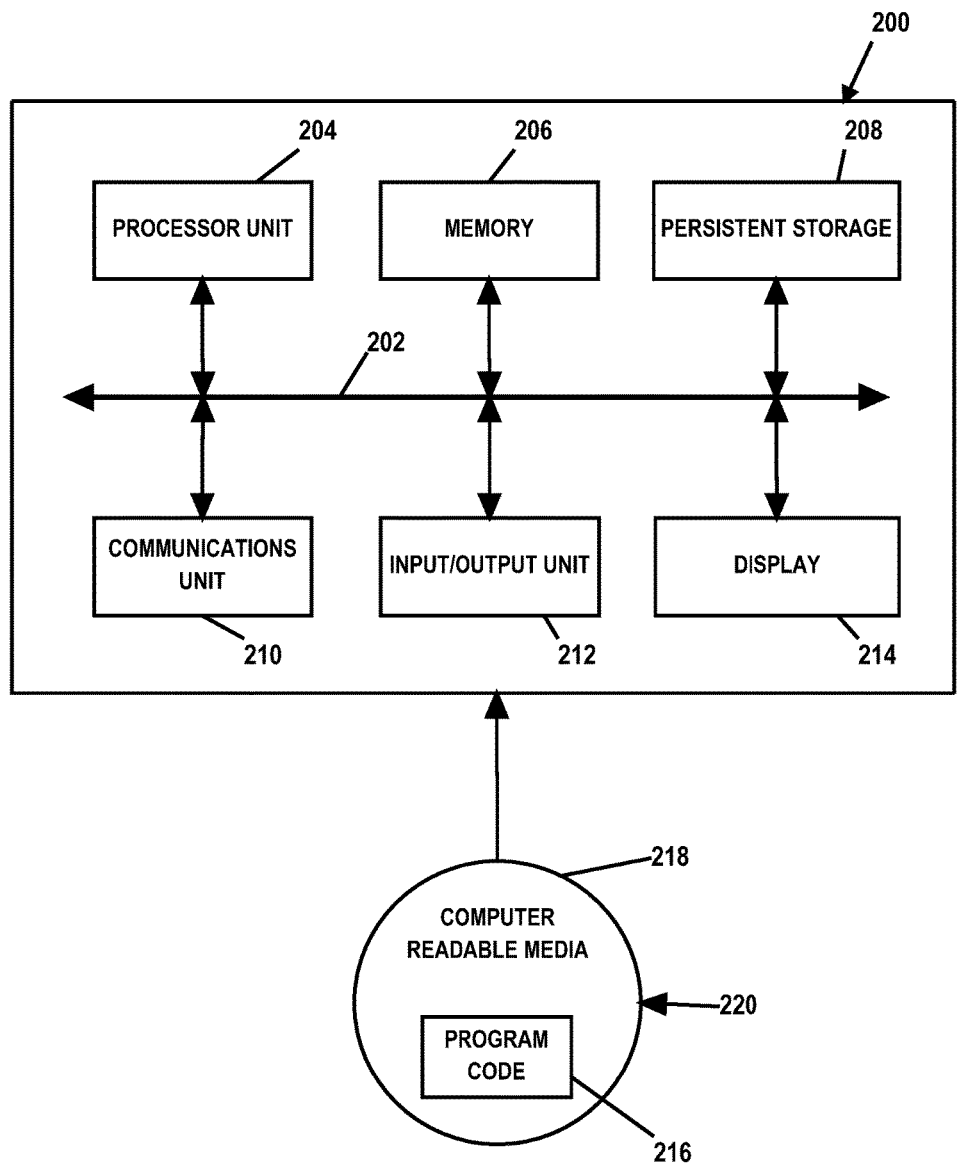
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for OCR-based single sign-on in a computing environment according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
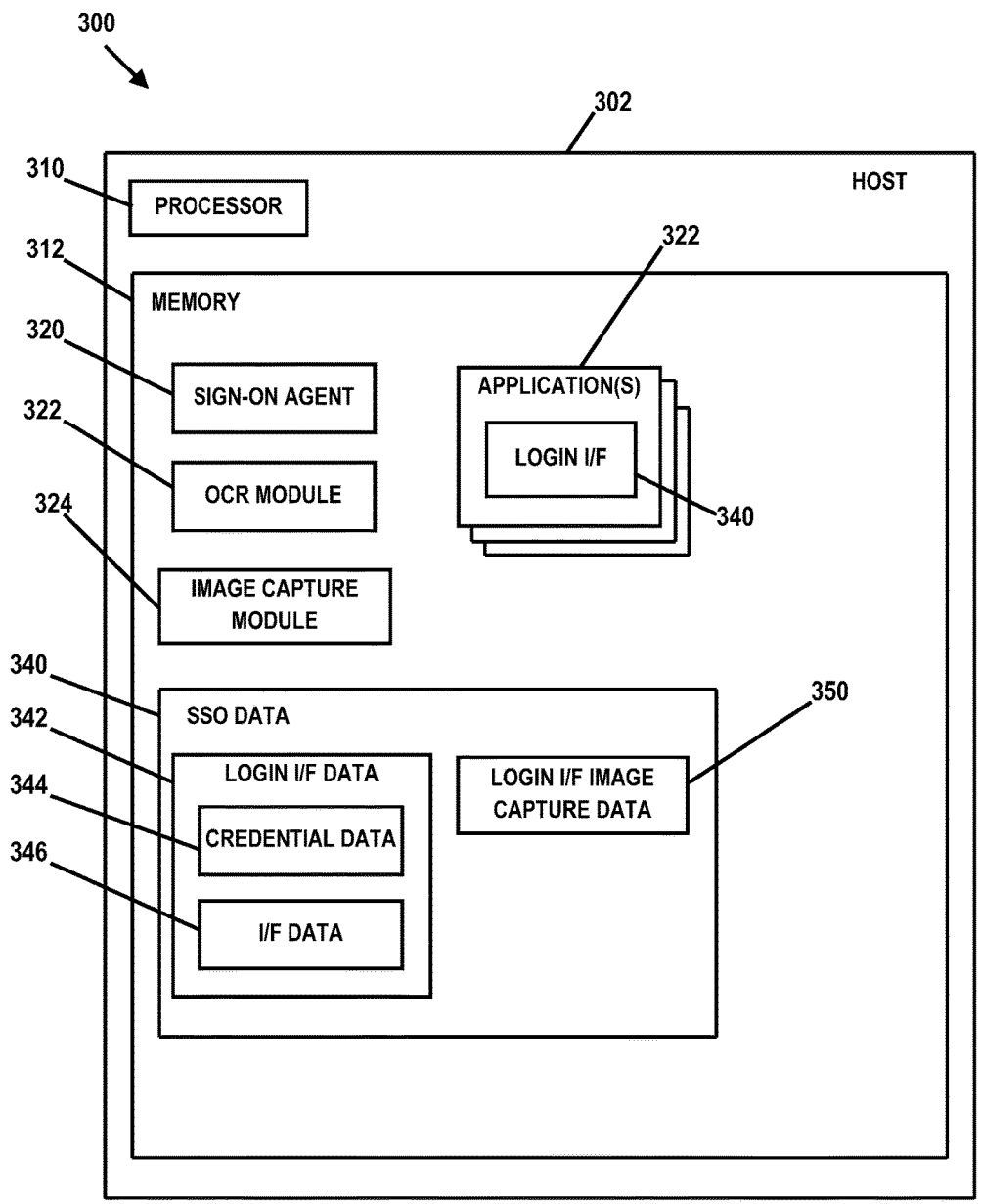
FIG. 3 is a diagram illustrating an embodiment of a computing environment in which illustrative embodiments of the present disclosure may be implemented.

FIG. 3 is a diagram illustrating a computing environment in which an embodiment of a system 300 for OCR-based single sign-on according to the present disclosure may be implemented. In the illustrated embodiment, system 300 includes a host 302 such as, but not limited to, client 110 and/or server 140, having processor unit 310 and a memory 312. In FIG. 3, memory 312 includes a sendkeys-based, single sign-on (SSO) agent 320, an optical character recognition (OCR) module 322, and an image capture module 324. Agent 320 is used to assist a user to automatically login and/or sign-on to multiple applications and/or systems using a single credential(s) (e.g., username and/or password). For example, a user may utilize agent 320 to login or sign-on one time and automatically gain access to multiple applications/systems without being prompted to login again at each distinct system/application. In the illustrated embodiment, agent 320 comprises a sendkeys-based agent such that agent 320 simulates mouse and/or keyboard events to input data into a particular application for automatically logging the user into the respective application (e.g., a login user interface). OCR module 322 is used to perform image analysis (e.g., optical character recognition analysis) on images to detect elements such as, but not limited to, alphanumeric characters, shapes, icons, input fields, etc. Agent 320, module 322, and module 324 may be implemented in any suitable manner using known techniques that may be hardware-based, software-based, or some combination of both. For example, agent 320, module 322, and/or module 324 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In the embodiment illustrated in FIG. 3, memory 312 includes one or more applications 330. Each application 330 may comprise an application that agent 320 automatically logs a user into based on the user being authenticated to agent 320. In the illustrated embodiment, application(s) 330 is depicted as residing on host 302; however, it should be understood that application(s) 330 may reside remote from host 302 (e.g., on a remote server accessed via a communication network such as the Internet, intranet, etc.). Each application 330 may include a login interface (I/F) 332 for displaying and/or receiving various information for logging in and/or authenticating user identification for the respective application 330. For example, a particular login I/F 332 may include one of more input fields, field descriptors (e.g., text/graphic elements identifying the type of information that should be entered into a particular input field), application name/identity, etc. In some embodiments, login I/F 332 may be a bitmapped image (e.g., a bitmapped image of a login interface window).

In FIG. 3, memory 312 also includes SSO data 340. SSO data 340 may include information used by agent 320 to automatically log a user into a respective application 330. For example, in the illustrated embodiment, SSO data 340 includes login I/F data 342 which may include information specific to each application 330 registered to agent 320 for automatic login. In FIG. 3, login I/F data 342 includes credential data 344 and I/F data 346. Credential data 344 may comprise an authentication credential(s) for a respective application 330. For example, credential data 344 may include information such as a username, password, personal identification number (PIN) or other credential that the user may otherwise input to the respective application 330 to gain access to the respective application 330. Credential data 344 may also include information unknown to the user (e.g., a login credential assigned to the user by a system administrator which is unknown to the user but used to authenticate the identity of the user to a particular application). I/F data 346 may include information corresponding to a login I/F 332 for a respective application 330. For example, I/F data 346 may include information related to the login I/F 332 of a respective application 330 such as, but not limited to, an image or screenshot of the respective login I/F 332, the order and/or types of credential inputs for the respective login I/F 332, and application 330 identity information.

In the embodiment illustrated in FIG. 3, SSO data 340 also includes login I/F image capture data 350. Capture data 350 includes information associated with one or more image captures of a respective login I/F 332 generated and/or otherwise obtained by image capture module 324. For example, in some embodiments, agent 320 may initiate and/or otherwise cause to be generated, via image capture module 324 or otherwise, one or more image captures or screenshots of a login I/F 332 to facilitate the monitoring and/or verification of what is rendered into the application login I/F 332 to ensure that authentication credentials are reliably injected into the correct input field(s) of the respective login I/F 332. For example, in some applications 330, a hooking mechanism may not be available, thereby creating the possibility that sendkeys-based inputs may not be input correctly. As an example, if a user happens to touch a mouse or keyboard while an SSO agent is performing sendkeys operations, a cursor may be inadvertently moved to a different location or bring the current application interface "out of focus" (e.g., a different application interface becomes active). In this scenario, the sendkeys credential string might be injected into the wrong place and cause SSO to fail. Further, if the credential is injected and/or placed into the wrong place on the application interface, or onto a totally different application like a "notepad," the credential may become visible on the display screen of the computing system. Further, if the application being logged into is a remote application (e.g., remote from host 302), the login interface may comprise a bitmapped image such that a SSO agent may not be able to hook into the remote application for injecting the authentication credentials.

In operation, agent 320 is configured to analyze image capture data 350 of a particular login I/F 332 while performing login operations to monitor and/or verify sendkey input operations on the particular login I/F 332. Agent 320 utilizes and/or otherwise utilizes screen/image captures and image recognition techniques (e.g., OCR) to obtain feedback while performing sendkeys input operations.

Figure 4:
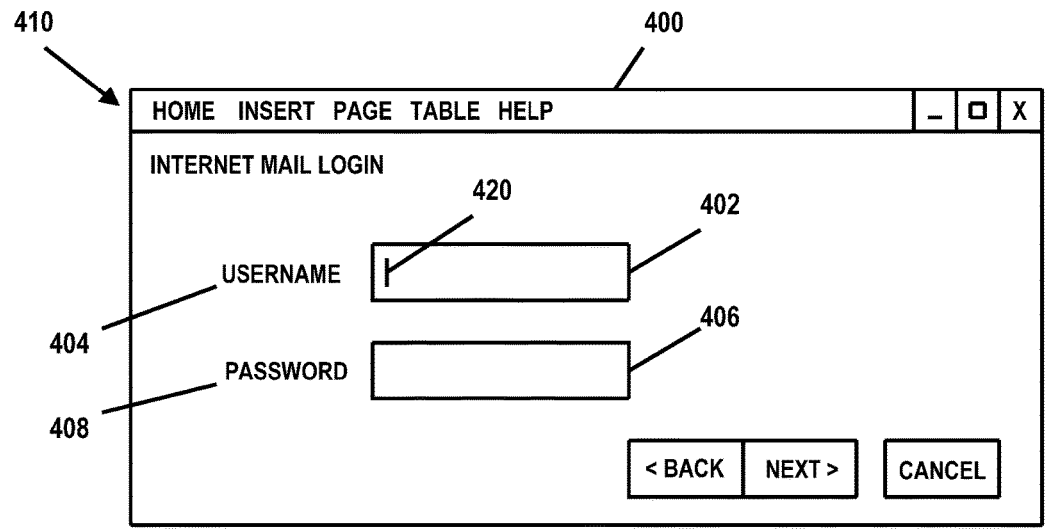
FIG. 4 is a diagram illustrating OCR-based single sign-on for an application login interface according to the present disclosure.
Figure 5:
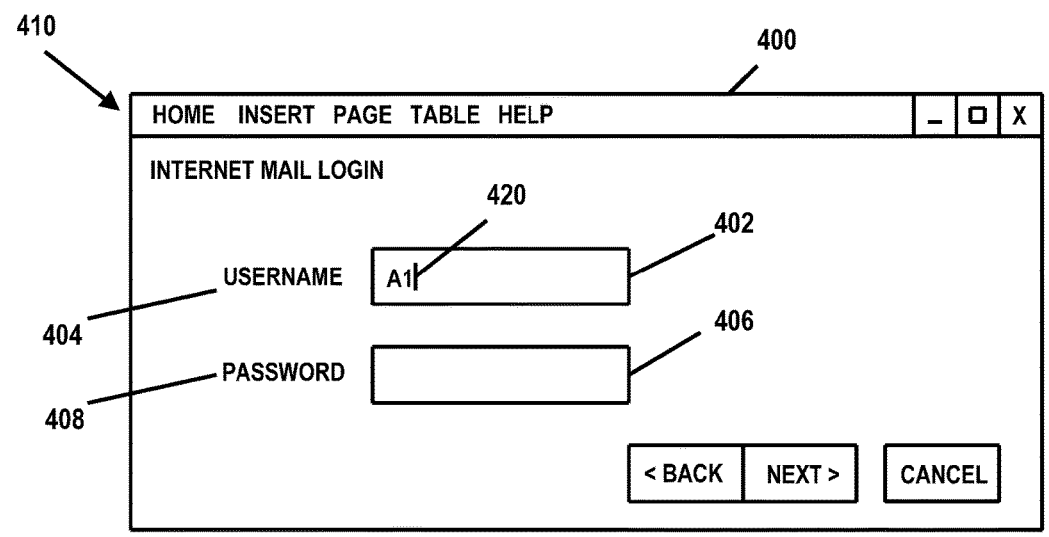
FIG. 5 is a diagram illustrating OCR-based single sign-on for the application login interface illustrated in FIG. 4 according to the present disclosure.
Figure 6:
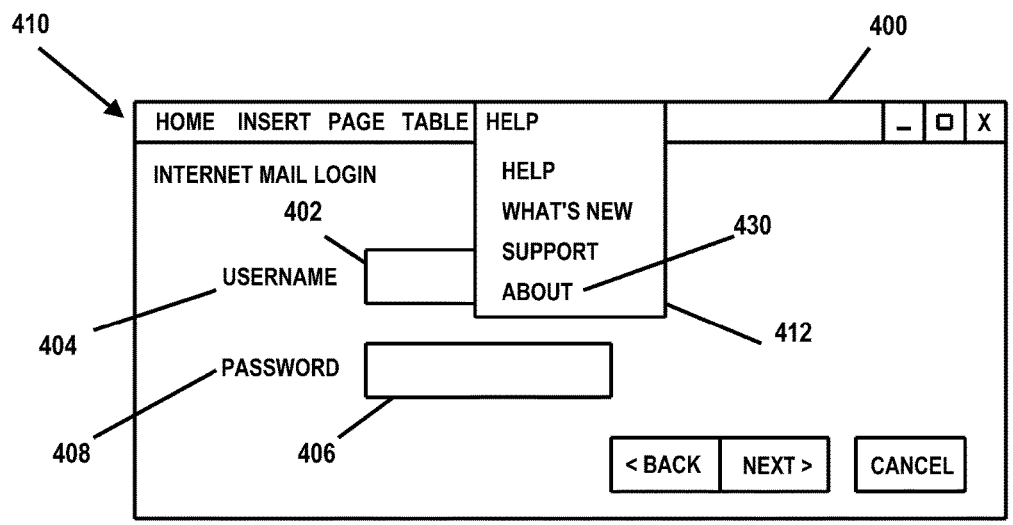
FIG. 6 is a diagram illustrating OCR-based single sign-on for the application login interface illustrated in FIGS. 4 and 5 according to the present disclosure.

FIGS. 4, 5 and 6 are diagrams illustrating OCR-based single sign-on in a computing environment in connection with a login I/F 400 (e.g., one of login I/F 332) for a particular application 330 in accordance with an embodiment of the present disclosure. In the illustrated embodiment, login I/F 400 comprise a login interface/window corresponding to an electronic mail application having an input field 402 to receive an input corresponding to a username 404 credential descriptor, and an input field 406 to receive an input corresponding to a password 408 credential descriptor. Login I/F 400 also includes a menu bar 410 including one or more menu options that may be selected (e.g., each menu option may comprise a drop-down menu window or may otherwise be selected/activated to initiate and/or launch a corresponding function). For example, as best illustrated in FIG. 6, a selection of a "HELP" menu bar 410 option may result in a drop-down window being displayed with additional sub-menu options). It should be understood that each login I/F for a respective application 330 may be differently configured. Various features and/or images/screenshots of the particular login I/F for a respective application may be stored in memory 312 as I/F data 346, and the credentials for input into, for example, input fields 402 and 406, may be stored as credential data 344.

Responsive to a launch of a particular application 330 and its corresponding login I/F 332 (e.g., I/F 400), agent 320 may cause an image/screenshot to be captured of the corresponding login I/F 332 and use image recognition techniques to analyze the image/screenshot and extract out image information (e.g., text, input fields, etc.) in positional order representing what is rendered on an application I/F screen, including the cursor position. For example, agent 320 may cause images/screenshots of login I/F 400 to be captured at various stages of a sendkey SSO attempt and use image recognition to extract out data to provide feedback on whether the characters being input/injected into login I/F 400 are being placed into the correct fields. Referring to FIG. 4, for example, responsive to a launch of a particular application 330 and its login I/F 400, agent 320 cause an image/snapshot to be captured (e.g., utilizing image capture module 324 or otherwise) and analyzes the captured image to determine/verify the location of a cursor 420 in the login I/F 400. Agent 320 may analyze the captured image (e.g., I/F image capture data 350) independently or compare the captured image to a known image of the login I/F 400 (e.g., which may be stored in memory 312 as I/F data 346) or previously captured images. If agent 320 determines that cursor 420 is not located in the desired position to inject the "username" string (e.g., within input field 402), agent 320 may send/initiate the necessary keystrokes to move cursor 420 to the correct location (e.g., to move cursor 420 to input field 402). In some embodiments, between some keystrokes, agent 320 may capture additional images and analyze the captured images to confirm that cursor 420 is moving as intended.

Referring to FIG. 5, in response to agent 320 verifying that cursor 420 is positioned in a desired position in login I/F 400 (e.g., on the "username" input field 402), agent 320 initiates sendkeys keystrokes to input the username character string to the login I/F 400. In some embodiments, between some keystrokes, agent 320 may capture additional images/screenshots, perform (or cause to be performed) OCR on the images/screenshots, and verify that the keystrokes submitted so far are displayed in the desired position on the login I/F 400 (e.g., to the immediate right of the "username" descriptor 404). In some embodiments, agent 320 may perform sendkeys keystroke operations to input a portion (e.g., one or more characters) of the entire credential 344 for the respective input field (e.g., the first two characters of the "username" credential ("A1" in FIG. 5)), cause another screenshot/image of login I/F 400 to be captured, and perform OCR on the captured screenshot/image to verify that the input characters appear on the login I/F 400. If so, agent 320 may repeat the process every few characters until the entire credential string is injected. If agent 320 detects (e.g., via OCR-ed text) of a captured image some un-expected text (e.g., a "password" descriptor appeared before the entire "username" credential is sent/input) displayed on login I/F 400, agent 320 may determine/detect that that the "username" credential has not been properly sent to login I/F 400. In this instance, agent 320 may abort or reset the login process, send a cancelling sendkey input (e.g., a "backspace" keystroke input) to undo a previously entered input, and/or otherwise perform additional sendkey keystroke operations to continue the login operation.

In some embodiments, after agent 320 confirms through OCR results of captured images that a particular login input has been entered correctly, agent 320 may initiate/send "tab" or "enter" sendkey keystroke commands to move cursor 420 to a next input field location (e.g., input field 406). The above procedure may be repeated by agent 320 to verify the location of cursor 420 next to the "password" descriptor 408 based on OCR analysis of images captured of login I/G 400. In some embodiments, for "password" or other types of credentials not intended to be displayed in a human-readable form on login I/F 400, agent 320 may verify that the OCR analysis of login I/F 400 images indicates that "*" or other non-descriptive characters are displayed on login I/F 400 for each character injected via sendkey input for a particular credential input field. If agent 320 detects that, while injecting a password or other credential that should not have displayed characters on login I/F 400, the injected character is displayed visibly on login I/F 400 instead of an expected "*", agent 320 may abort the login operation, send a cancelling sendkey input (e.g., a "backspace" keystroke input) to undo a previously entered input, and/or otherwise perform additional sendkey keystroke operations to continue the login operation.

In some embodiments, agent 320 may perform comparisons between the character strings and cursor positioning between consecutive images/screenshots to confirm that the differences are as expected. Further, in some embodiments, agent 320 may be configured to input/send a test character(s) (e.g., a "space" keystroke) via a sendkey command to determine whether such command moves the cursor 420 in the correct field before entering the corresponding credential. If OCR results of the captured image/screenshot indicate success, agent 320 may send a cancelling character(s) (e.g., a "backspace" keystroke) via a sendkeys command to undo the test character before proceeding to send the real/actual credential characters to the respective input field. Further, if agent 320 cannot verify the "state" the login operation is in within login I/F 400, agent 320 may send one or more keystrokes (e.g., "Alt U") via sendkeys commands to bring cursor 420 back to the first field or bring to bring login operation back to a known state, where agent 320 may then resume and/or to attempt SSO again.

In some embodiments, agent 320 may be configured to send keystrokes to provoke certain changes in login I/F 400 to confirm certain aspects of the respective application 330 before proceeding with SSO operations. For example, referring to FIG. 6, agent 320 may send keystrokes to navigate to and click on an "About" menu option button 430 to bring up the "About this" dialog window/screen for the respective application 330. Agent 320 may then cause an image/screenshot to be captured of the dialog window/screen, perform OCR analysis on the captured image/screenshot, and retrieve certain information about the respective application 330 (e.g., version number) that may be used to verify the correct application login I/F is active and/or drive subsequent SSO actions.

Figure 7:
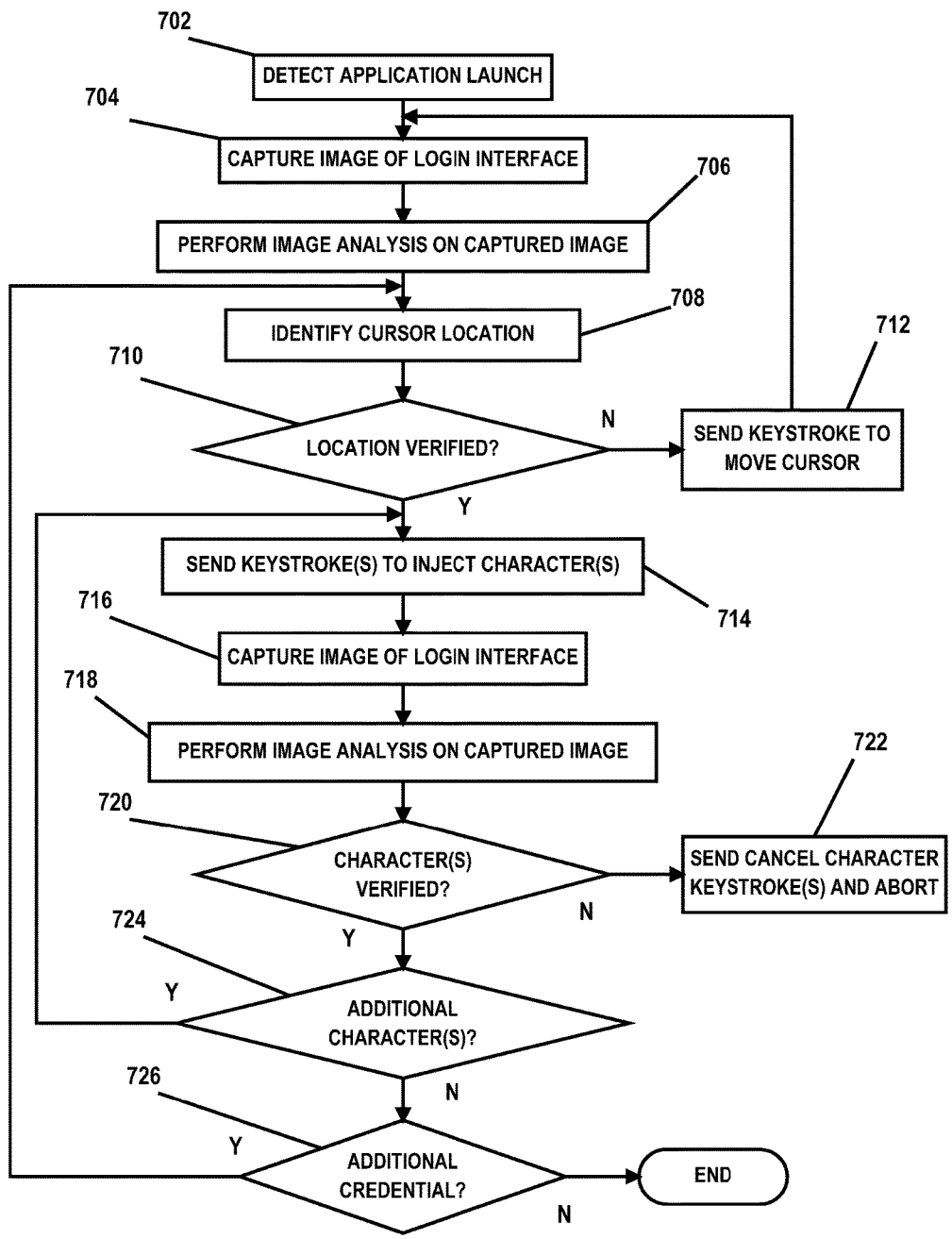
FIG. 7 is a flow diagram illustrating an embodiment of a method for OCR-based single sign-on in a computing environment according to the present disclosure.

FIG. 7 is a flow diagram illustrating an embodiment of a method for OCR-based single sign-on in a computing environment according to the present disclosure. The method begins at block 702, where agent 320 detects the launch of an application 330 for performing a SSO operation. At block 704, agent 320 captures and/or otherwise causes the capture of an image/screenshot of a login I/F 332 of the application 330. At block 706, agent 320 performs and/or otherwise interfaces with module 322 to perform image analysis on the captured image/screenshot (e.g., OCR analysis). At block 708, agent 320 identifies a cursor location within the login I/F 332 based on the analyzed image.

At decisional block 710, a determination is made whether the cursor location is in a desired position for inputting a particular authentication credential. If not, the method proceeds to block 712, where agent 320 may send a sendkeys-based keystroke command to move the cursor location within the login I/F 332. The method then proceeds to block 704. If at decisional block 710 it is determined that the cursor location is verified to correspond to a desired position for inputting a particular authentication credential, the method proceeds from decisional block 710 to block 714, where agent 320 may send one or more sendkeys-based keystroke commands to inject one or more characters into the login I/F 332 for the SSO procedure. The input characters may be credential data 344 or test characters. At block 716, agent 320 captures and/or otherwise causes the capture of an image/screenshot of the login I/F 332 of the application 330. At block 718, agent 320 performs and/or otherwise interfaces with module 322 to perform image analysis on the captured image/screenshot. At decisional block 720, a determination is made whether the analyzed image indicates that the input characters are as expected (e.g., the identity of the characters and/or position within login I/F 332). If not, the method proceeds to block 722, where agent 320 may send a cancel keystroke command to undo the previously input characters, and agent 320 may thereafter abort the SSO procedure. It should be understood that in some embodiments, agent 320 may be configured to send cancelling keystroke commands and thereafter change a cursor location to continue the SSO process. Agent 320 may also send a keystroke command to bring the SSO procedure to a known state (e.g., return the cursor to the first field of the login I/F 332). Thus, it should be understood that the method may be altered and/or repeated some number of times before aborting the SSO procedure if the results of the SSO procedure are not as expected by agent 320 based on the analysis of the captured images/screenshots.

If at decisional block 720 a determination is made that the analyzed image indicates that the input characters are as expected, the method proceeds to decisional block 724, where a determination is made whether additional characters of the authentication credential need to be entered/injected into login I/F 330 for the current input field. If so, the method proceeds to block 714. If no further characters are needed to be input to the current field, the method proceeds to decisional block 726, where a determination is made whether another credential needs to be input into login I/F 330 to complete the SSO operation for the respective application 330. If so, the method proceeds to block 708. If not, the method may end.

Thus, embodiments of the present disclosure enable an SSO procedure to be carried out using image/screenshot analysis to monitor and verify various steps of the SSO procedure, thereby providing feedback to the SSO agent performing the SSO procedure. Embodiments of the present disclosure utilize one or more screenshots/image captures of an application login interface and image analysis of the captured screenshots/images to monitor positional information, character insertion information, and/or other features associated with verifying proper SSO operations.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
   responsive to launching a login interface of an application, automatically causing a display of a dialog screen of the application;
   automatically capturing an image of the dialog screen;
   deriving version information about the application from the image of the dialog screen;
   automatically capturing an image of the login interface;
   automatically verifying that the launched login interface corresponds to a version of the application based on the version information derived from the image of the dialog screen; and
   responsive to successfully verifying that the launched login interface corresponds to the version of the application derived from the image of the dialog screen, initiating a login procedure to the application.

2. The method of claim 1, further comprising:
   determining a location of a cursor on the login interface from the image of the login interface;
   determining whether the location of the cursor corresponds to a credential input field of the login interface; and
   responsive to determining that the location of the cursor corresponds to the credential input field of the login interface, automatically sending a keystroke to the login interface to insert at least one character to the login interface.

3. The method of claim 2, wherein:
   responsive to determining that the location of the cursor does not correspond to the credential input field, automatically sending a keystroke to the login interface to move the cursor;
   capturing another image of the login interface; and
   determining from the another image whether the moved location of the cursor corresponds to the credential input field of the login interface.

4. The method of claim 2, further comprising:
   responsive to sending the keystroke to the login interface to insert the at least one character to the login interface, capturing another image of the login interface; and
   verifying from the another image that the at least one character is positioned within the credential input field.

5. The method of claim 4, further comprising, responsive to determining from the another image that the at least one character is not positioned within the credential input field, aborting login to the application.

6. The method of claim 2, wherein sending the keystroke to the login interface to insert the at least one character to the login interface comprises inserting at least one character of a login credential.

7. The method of claim 2, wherein sending the keystroke to the login interface to insert the at least one character to the login interface comprises inserting at least one test character, and further comprising:
   capturing another image of the login interface;
   determining from the another image whether a location of the test character in the login interface corresponds to the credential input field of the login interface;
   responsive to determining that the location of the test character in the login interface corresponds to the credential input field of the login interface, automatically sending a keystroke to the login interface to insert a cancelling character to undo the test character; and
   automatically sending a keystroke to the login interface to insert at least one character of a login credential to the login interface to insert the login credential to the login interface.

8. A system, comprising:
   a hardware processor; and
   a sign-on agent executable by the processor to:
      responsive to launching of an application login interface, capture an image of the login interface;
      determine a location of a cursor on the login interface from the image;
      determine whether the location of the cursor corresponds to a credential input field of the login interface;
      responsive to determining that the location of the cursor corresponds to the credential input field of the login interface, automatically send a keystroke to the login interface to insert at least one character to the login interface;
      capture another image of the login interface;
      determine from the another image whether a value of the at least one character is displayed when the value of the at least one character should not be displayed based on a type of the credential input field; and
      responsive to determining that the value of the at least one character is displayed when the value should not be displayed, automatically send a keystroke to the login interface to insert a cancelling character to undo the insertion of the at least one character.

9. The system of claim 8, wherein the sign-on agent is executable to:

responsive to determining that the location of the cursor does not correspond to the credential input field, automatically send a keystroke to the login interface to move the cursor;

cause another image of the login interface to be captured; and determine from the another image whether the moved location of the cursor corresponds to the credential input field of the login interface.

10. The system of claim 8, wherein the sign-on agent is executable to:

responsive to sending the keystroke to the login interface to insert the at least one character to the login interface, cause another image of the login interface to be captured; and verify from the another image that the at least one character is positioned within the credential input field.

11. The system of claim 10, wherein the sign-on agent is executable to, responsive to determining from the another image that the at least one character is not positioned within the credential input field, abort login to the application.

12. The system of claim 8, wherein the sign-on agent is executable to:

automatically send a keystroke to the login interface to invoke a dialog window of the application;

cause an image of the dialog window to be captured; and analyze the image of the dialog window to verify at least one aspect of the application.

13. The system of claim 8, wherein the sign-on agent is executable to send the keystroke to the login interface to insert at least one character of a login credential to the credential input field.

14. The system of claim 8, wherein the sign-on agent is executable to send the keystroke to the login interface to insert at least one test character to the credential input field, and wherein the sign-on agent is further executable to:

cause another image of the login interface to be captured;

determine from the another image whether a location of the test character in the login interface corresponds to the credential input field of the login interface;

responsive to determining that the location of the test character in the login interface corresponds to the credential input field of the login interface, automatically send a keystroke to the login interface to insert a cancelling character to undo the test character; and automatically send a keystroke to the login interface to insert at least one character of a login credential to the login interface to insert the login credential to the login interface.

15. A computer program product for OCR-based single-sign-on in a computing environment, the computer program product comprising:

a non-transitory computer readable medium having computer readable program code embodied therewith, the computer readable program code comprising computer readable program code configured to:

responsive to launching a login interface of an application, automatically cause a display of a dialog screen of the application;

automatically capture an image of the dialog screen;

derive version information about the application from the image of the dialog screen;

automatically capture an image of the login interface; and automatically verify that the launched login interface corresponds to a version of the application based on the version information derived from the image of the dialog screen; and responsive to successfully verifying that the launched login interface corresponds to the version of the application derived from the image of the dialog screen, initiate a login procedure to the application.

16. The computer program product of claim 15, wherein the computer readable program code is configured to:

determine a location of a cursor on the login interface from the image of the login interface;

determine whether the location of the cursor corresponds to a credential input field of the login interface; and responsive to determining that the location of the cursor corresponds to the credential input field of the login interface, automatically send a keystroke to the login interface to insert at least one character to the login interface.

17. The computer program product of claim 16, wherein the computer readable program code is configured to:

responsive to determining that the location of the cursor does not correspond to the credential input field, automatically send a keystroke to the login interface to move the cursor;

cause another image of the login interface to be captured; and determine from the another image whether the moved location of the cursor corresponds to the credential input field of the login interface.

18. The computer program product of claim 16, wherein the computer readable program code is configured to:

responsive to sending the keystroke to the login interface to insert the at least one character to the login interface, cause another image of the login interface to be captured; and verify from the another image whether the at least one character is positioned within the credential input field.

19. The computer program product of claim 18, wherein the computer readable program code is configured to, responsive to determining from the another image that the at least one character is not positioned within the credential input field, abort login to the application.

20. The computer program product of claim 16, wherein the computer readable program code is configured to:

send the keystroke to the login interface to insert at least one test character to the credential input field;

cause another image of the login interface to be captured;

determine from the another image whether a location of the test character in the login interface corresponds to the credential input field of the login interface;

responsive to determining that the location of the test character in the login interface corresponds to the credential input field of the login interface, automatically send a keystroke to the login interface to insert a cancelling character to undo the test character; and automatically send a keystroke to the login interface to insert at least one character of a login credential to the login interface to insert the login credential to the login interface.

* * * * *